(12) United States Patent
Jorgovanovic

(10) Patent No.: US 9,826,529 B1
(45) Date of Patent: Nov. 21, 2017

(54) ADAPTIVE WIRELESS FREQUENCY BAND SHARING

(71) Applicant: Amazon Technologies, Inc., Reno, NV (US)

(72) Inventor: Milos Jorgovanovic, Sunnyvale, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 117 days.

(21) Appl. No.: 14/743,590

(22) Filed: Jun. 18, 2015

(51) Int. Cl.
| | | |
|---|---|---|
| *H04W 72/04* | (2009.01) | |
| *H04W 4/00* | (2009.01) | |
| *H04L 5/14* | (2006.01) | |
| *H04W 72/08* | (2009.01) | |

(52) U.S. Cl.
CPC ....... *H04W 72/0446* (2013.01); *H04L 5/1461* (2013.01); *H04W 4/008* (2013.01); *H04W 72/085* (2013.01)

(58) Field of Classification Search
CPC H04W 4/008; H04W 72/082; H04W 72/1215
See application file for complete search history.

(56) References Cited

U.S. PATENT DOCUMENTS

| | | | | |
|---|---|---|---|---|
| 2005/0276241 | A1* | 12/2005 | Kamerman | H04W 28/06 370/328 |
| 2009/0258607 | A1* | 10/2009 | Beninghaus | H04B 1/3805 455/77 |
| 2010/0130248 | A1* | 5/2010 | Schmidt | H04B 7/2653 455/553.1 |
| 2010/0309831 | A1* | 12/2010 | Yeh | H04W 52/0216 370/311 |
| 2010/0322287 | A1* | 12/2010 | Truong | H04W 72/1215 375/133 |
| 2015/0334706 | A1* | 11/2015 | Mukherjee | G06F 9/5027 370/329 |
| 2016/0278035 | A1* | 9/2016 | Yae | H04W 56/0025 |

\* cited by examiner

*Primary Examiner* — Omer S Mian
(74) *Attorney, Agent, or Firm* — Hogan Lovells US LLP

(57) ABSTRACT

Various approaches discussed herein enable establishing a wireless connection with one or more devices, where the wireless communication with each device utilizes one or more technologies that share a frequency band for data transmission. Data is communicated, for example alternatively, over the frequency band with the one or more devices. During a first period of data transmission, one of the wireless connections is assigned a portion of the period to communicate data, while another of the wireless connections assigned another portion of the period to communicate data. An actual amount of the period used by one of the wireless connections is determined, and in a following period, the portions of the following period assigned to one or more of the wireless connections may be adjusted, based on the actual amount, a quality determination, or a combination of both.

20 Claims, 6 Drawing Sheets

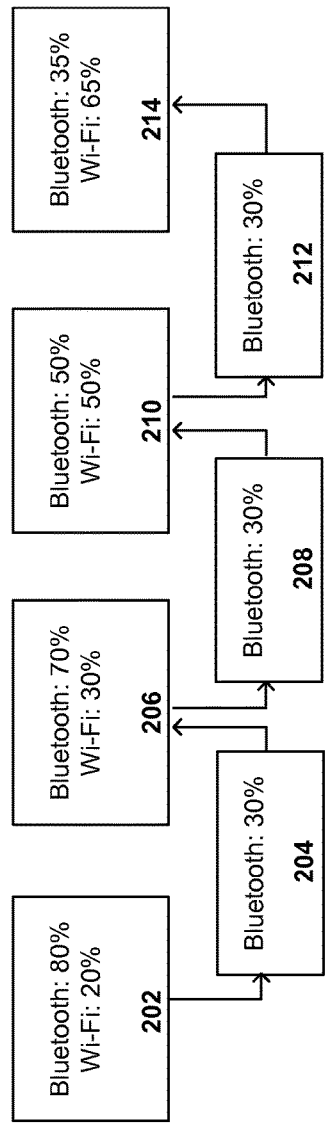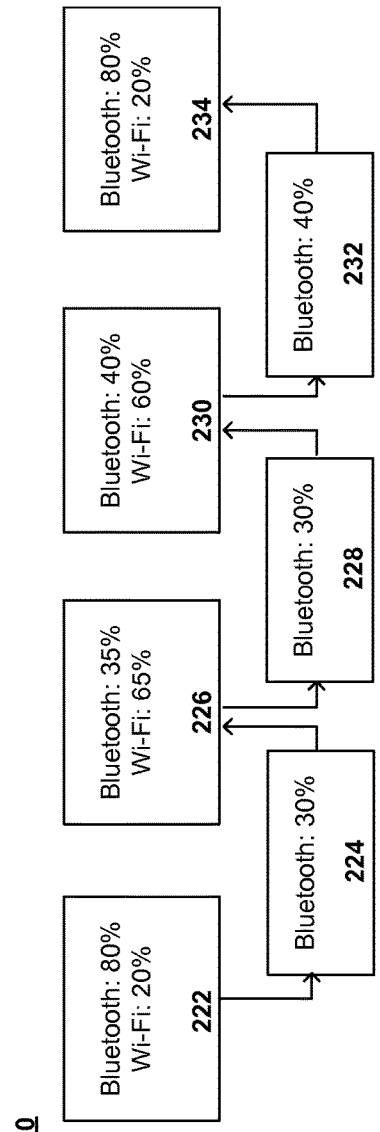

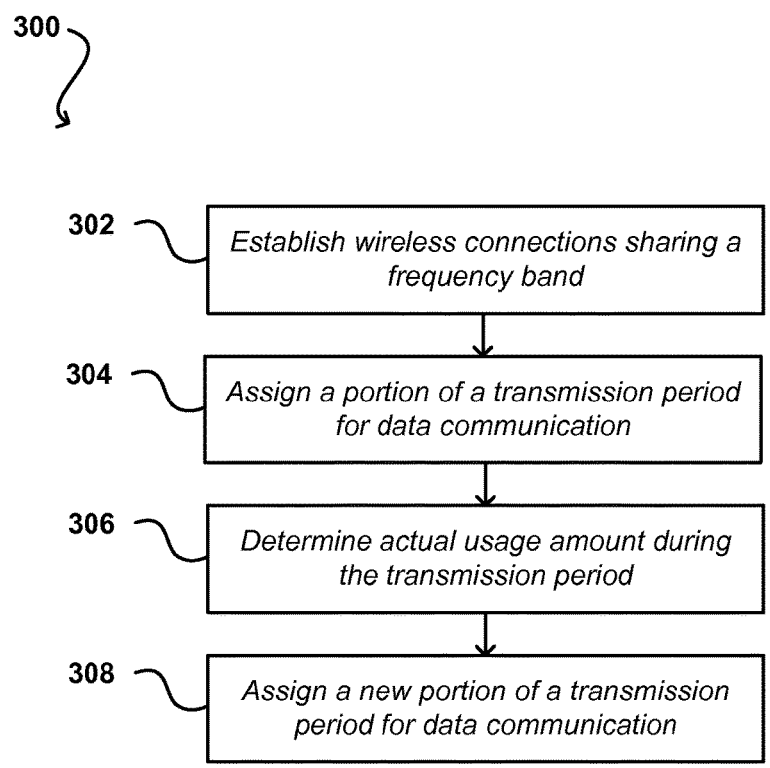

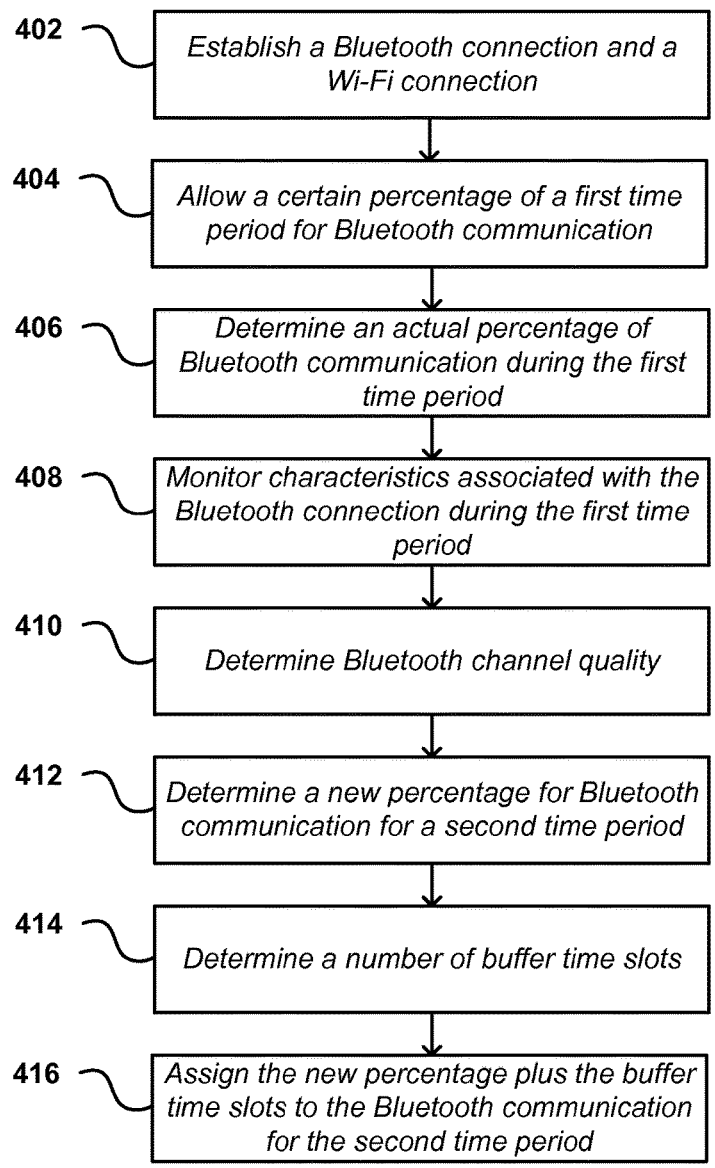

ADAPTIVE WIRELESS FREQUENCY BAND SHARING

BACKGROUND

People are increasingly utilizing wireless communication technologies to transmit data between electronic devices. For example, people may have a Wi-Fi access point in their home that provides internet access to their computers, laptops, smart phones, game systems, and network appliances, along with a Bluetooth-enabled speaker, headset, or game controller that connects with one or more of their Wi-Fi enabled devices, and other devices, all of which may benefit from communicating with each other. In order to facilitate these wireless connections, data must be transmitted at various dedicated frequencies along the electromagnetic spectrum, depending for example on the technology used. Devices may attempt to transmit data using the same frequency band, which can result in interference and degraded performance.

BRIEF DESCRIPTION OF THE DRAWINGS

Various embodiments in accordance with the present disclosure will be described with reference to the drawings, in which:

FIG. 2A illustrates an example approach for adaptively adjusting allotments of various transmission periods between wireless communication approaches, in accordance with various embodiments;

FIG. 2B illustrates an example approach for adaptively adjusting allotments of various transmission periods between wireless communication approaches, in accordance with various embodiments;

FIG. 3 illustrates an example process for adaptive wireless frequency band sharing, in accordance with various embodiments;

FIG. 4 illustrates an example process for adaptive wireless frequency band sharing, in accordance with various embodiments;

DETAILED DESCRIPTION

Systems and methods in accordance with various embodiments of the present disclosure may overcome one or more of the aforementioned and other deficiencies experienced in conventional approaches for wireless communication using the same frequency band. In particular, various embodiments enable a device, such as a wireless-enabled device, to receive and transmit data, for example to another wireless-enabled device, using one or more wireless technologies that operate on the same frequency band, for example Wi-Fi and Bluetooth.

Various approaches discussed herein enable establishing a wireless connection with one or more devices, such as a Wi-Fi router and a Bluetooth device, where the wireless communication with the devices utilizes one or more technologies that share a frequency band for data transmission, for example Wi-Fi and Bluetooth sharing the 2.4 GHz band, although the approaches described herein are not limited to any particular technology or frequency band. Data is communicated, for example alternating between the devices, over the frequency band with the one or more devices, such as network traffic with the Wi-Fi router and audio data with a Bluetooth speaker. During a first period of data transmission, one of the wireless connections, such as Bluetooth, is assigned a portion of the period to communicate data, while another of the wireless connections, such as Wi-Fi, is assigned a separate portion of the period (e.g., the remainder or some other amount) to communicate data. For example, the period may be a frame, and Bluetooth may be assigned a certain number of time slots of the frame (or a percentage of the frame, or both), with the Wi-Fi connection being assigned the remainder of the time slots (or the remaining percentage of the frame). An actual amount of the period (e.g., frame) used by one of the wireless connections (e.g., Bluetooth) may be determined, and in a following period, the portions of successive periods assigned to one or more of the wireless connections may be adjusted (e.g., upwards or downwards, depending on various factors) to maximize use of the transmission periods, for example if the Bluetooth connection did not utilize all of its allotted portion of the transmission period.

Accordingly, approaches in accordance with various embodiments improve the operation and performance of the computing device(s) on which they are implemented and with which they communicate wirelessly by, among other advantages, maximizing efficiency of wireless communications by adaptively adjusting allotted usage of various wireless connections. Various other applications, processes, and uses are presented below with respect to the various embodiments, each of which improves the operation and performance of the computing device(s) on which they are implemented.

Figure 1:
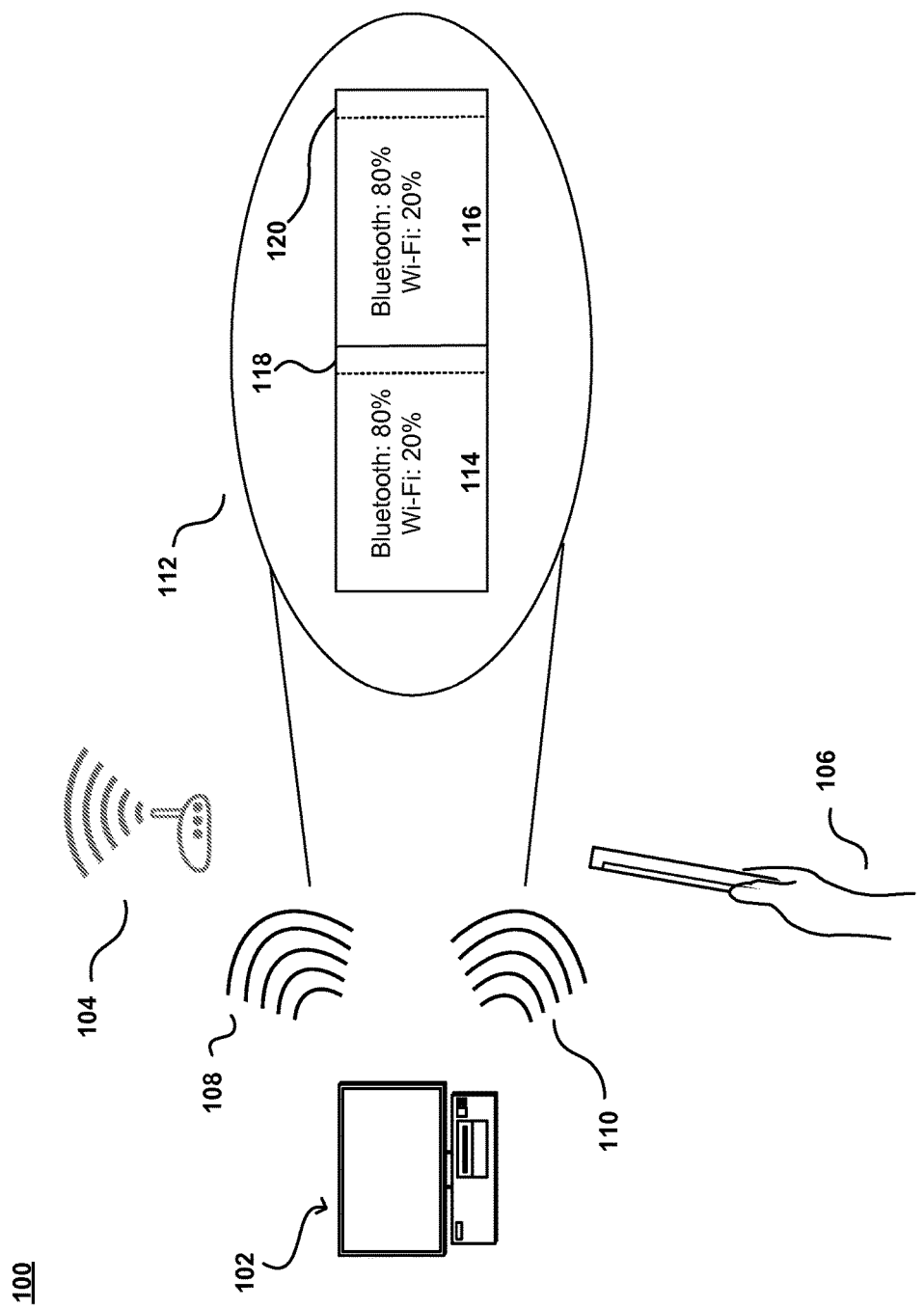
FIG. 1 illustrates an example of a wireless-enabled device, such as a set-top media streaming device, communicating wirelessly with two wireless-enabled devices, in accordance with various embodiments.

FIG. 1 illustrates an example 100 of a wireless-enabled device 102, such as a set-top media streaming device, communicating wirelessly 108, 110 with two wireless-enabled devices 104, 106, such as a Wi-Fi router and a Bluetooth game controller. While the devices in this example may be wireless-enabled computing devices and accessories such as desktops, laptops, smart phones, game systems, network appliances, speakers, headsets, remotes, or game controllers as a few examples, it should be understood that any appropriate computing or electronic device capable of wireless data transmission may take advantage of aspects of the various embodiments.

In the example illustrated in FIG. 1, the two wireless-enabled devices 104, 106 are communicating data over wireless connections 108, 110 with the "base" or "master" wireless-enabled device 102 (the terms "base" and "master" being used for clarity only). For example, the base wireless-enabled device 102 may be communicating data over Wi-Fi with a Wi-Fi base station such as wireless-enabled device 104, while also communicating data over Bluetooth with a Bluetooth game controller such as wireless-enabled device 106. According to an embodiment, the base wireless-enabled device 102 may have a combined Wi-Fi and Bluetooth radio, such that only one technology may transmit at a time (e.g., the devices are linked together with input/output signaling pins or "wires," wherein an output wire is asserted by a radio when transmitting, which indicates to the other device on the corresponding input wire that it should refrain from transmitting during this time, etc.), or may be using wireless technologies that use the same ISM (Industrial, Scientific and Medical) frequency bands (e.g., 900 MHz, 2.4 GHz, 5.8 GHz), as may be the case with Wi-Fi and Bluetooth, and may not be able to utilize approaches allowing for the technologies to occupy the same frequency band for simultaneous data communication. For example, a Bluetooth and Wi-Fi radio may come in a single component (e.g., chipset) that provides the capability for both technologies to transmit over antennas, in some cases over a shared antenna communicatively coupled to the chipset. Such single (or combo) radios may have a co-existence engine/module/block, implemented in hardware or software (e.g., executing on a microcontroller of the chipset). In some embodiments, the techniques described herein may be implemented by modifying the co-existence engine/module/block, for example through a firmware update or other type of software update. In an embodiment, the architecture of the device and/or devices utilized as part of the techniques described herein is incapable of communicating in multiple wireless technologies and/or protocols simultaneously. In another embodiment, the architecture of the device and/or devices utilized as part of the techniques described herein are capable of communicating in multiple wireless technologies and/or protocols simultaneously, but an option (e.g., a user option, a firmware setting, etc.) is asserted wherein the capability is disabled.

For example, Wi-Fi and Bluetooth both occupy a section of the 2.4 GHz ISM band, and it may be necessary to switch back and forth between them; for example, in order to minimize interference. In an embodiment, and as further described herein, multiple technologies that use the same ISM band (e.g., Bluetooth, Wi-Fi, various instance of the 802.15.4 family of standards such as ZigBee, etc.) are configured to coexist by switching back and forth between them, such as with a Time Division Duplex (TDD) approach (while other embodiments may utilize a Time Division Multiplexing (TDM) or other approach, for purposes of clarity the disclosure will discuss TDD with regard to the techniques described herein; however, it should be understood that the approaches are not limited to TDD). Because the technologies utilized in various embodiments are either incapable of simultaneous transmission, or a setting that enables such capability is disabled, the device(s) have to switch between whichever wireless communication technologies are being used in the particular embodiment, such as Bluetooth and Wi-Fi. For example, for some period of time (e.g., 10 milliseconds, 625 microseconds, etc.), or for a certain number of portions in a transmission period (e.g., time slots in a TDD frame), or for a certain percentage of a period (e.g., 70%, such as of available time slots), one of the wireless technologies will utilize the radio for data transmission, and then once the usage limit is over, the other technology will utilize the radio for data transmission, and so forth in alternating fashion in successive transmission periods.

According to an embodiment, the amount of time (or periods, frames, percentage, etc.) each technology is allotted for transmitting is defined by a wireless protocol, profile, or other set of standards, instructions, settings, etc. For example, a base device may be communicating with a Wi-Fi device and a Bluetooth device, as described herein. The Wi-Fi communication will be active for a certain period, and then will stop transmitting so the Bluetooth communication can be active, and the technologies will alternate in this fashion (e.g., utilizing TDD/TDM/etc.). The Bluetooth device (or another device) may be associated with particular settings, such as a Bluetooth profile (e.g., Advanced Audio Distribution Profile (A2DP), Human Interface Device Profile (HID), etc.), which may provide a predefined (e.g., default) amount of transmission for the Bluetooth technology during each period (e.g., time, frames, percentage, etc.). For example, an A2DP Bluetooth profile may provide that the host device communicating over Bluetooth with the Bluetooth device associated with the profile allot 80% of each transmission period to Bluetooth. If the device communicating with the Bluetooth device is also communicating with another device using a different technology and over the same frequency, such that the two technologies are not communicating simultaneously, then the remaining 20% of each transmission period would be allotted to the other technology (e.g., Wi-Fi).

While such an approach may be suitable in some situations, such as the Bluetooth connection requiring a great deal of transmission time/frames/etc., as may be the case with high-definition audio transmission, it may be the case that the Bluetooth communication does not need the entire transmission period as assigned (e.g., by the Bluetooth profile or some other setting or instruction). It would be advantageous for an approach to adaptively reduce a transmission period that is not being fully utilized and assign at least some of the unused transmission period to other technologies. By doing so, data transmission may be optimized (e.g., not wasting potential transmission time by over-allotting a portion of transmission periods), improving the performance, reliability, and user experience of all involved devices.

As used throughout this disclosure, Wi-Fi and Bluetooth are just two examples of wireless communication technologies capable of being utilized with the approaches described herein. Those of ordinary skill in the art will appreciate that the systems and methods described herein apply to a variety of other hardware and software settings and wireless communication technologies across a variety of computing devices, peripherals, components and the like. Other examples of wireless communication technologies which may be utilized in concert with the approaches described herein may include Wi-Fi, Bluetooth, Bluetooth Low Energy (Bluetooth LE), ZigBee, and/or any other wireless transmission technology currently in use or developed in the future, wherein for example the communications occupy the same frequency band (e.g., 2.4 GHz, etc.), and/or are otherwise capable of interfering with each other, such that simultaneous transmission is not optimal, deselected, or impossible.

Turning back to the example of FIG. 1, the two wireless-enabled devices 104, 106 are communicating data over wireless connections 108, 110 with the "base" or "master" wireless-enabled device 102. As discussed earlier and in more detail herein, the wireless connections 108, 110 in this example occupy the same frequency band (e.g., 2.4 GHz, etc.), and/or are otherwise capable of interfering with each other, such that simultaneous transmission is not optimal, is deselected, and/or is impossible. For purposes of this example, device 104 is a Wi-Fi device (e.g., router, access point, modem, repeater, etc.) and device 106 is a Bluetooth device (e.g., audio device, remote control, game controller, etc.). Wi-Fi device 104 is communicating data with the base device 102 using a Wi-Fi connection 108 and Bluetooth device 106 is communicating data with the base device 102 using a Bluetooth connection 110.

In an example embodiment, the Wi-Fi connection and the Bluetooth connection are enabled to coexist in the same frequency band by switching communication back and forth between them, in this example by using a TDD approach. In this example, the Bluetooth connection is assigned 80% of the transmission period (e.g., time, frames, time slots, etc.) and the Wi-Fi connection is assigned the remaining amount of the transmission period (20% in this example). For example, the Bluetooth connection will become active and capable of transmitting for the first 80% of the transmission period, and then will stop transmitting, wherein the Wi-Fi connection will become active and capable of transmitting for the remaining amount of the transmission period, and the technologies will alternate in a similar fashion going forward. As discussed herein, the percentage assignment for Bluetooth may be determined based on a Bluetooth profile or other approach.

An example 112 of two successive transmission periods 114, 116 is illustrated in the example of FIG. 1. As indicated in FIG. 1, the Bluetooth connection receives 80% of the first transmission period 114 and the Wi-Fi connection then receives the remaining 20% of the first transmission period 114. There is in some embodiments a "guard time" or other buffer 118, 120 included as part of each frame. This buffer in various embodiments may comprise time slots or other allotments of one or more transmission periods (e.g., frames) potentially assigned to one (or more) of the wireless connections (e.g., Bluetooth), and may be utilized to compensate for channel changes or an unexpected increases in data traffic. For example, the buffer 118 associated with the first transmission period 114 may be associated with and assigned to the Bluetooth connection, and the amount of the buffer is included in the 80% allotment. In some embodiments, there may be no buffer or a buffer of size zero. A second transmission period 116 then follows, where as in the previous transmission period 114, the Bluetooth connection receives 80% of the second transmission period 116 and the Wi-Fi connection then receives 20% of the second transmission period 116. In various embodiments, the connections may utilize all their allotted portion of the transmission period before "handing off" to the other connection, or the connections may alternate communications within a transmission period in accordance with their respective overall allotted portions. In some embodiments, the Bluetooth radio (or Bluetooth portion of an integrated Wi-Fi/Bluetooth controller) will be "on" for 80% of the transmission period and the Wi-Fi radio will be "on" for the remaining portion. In some embodiments, three or more wireless connections may share a frequency band utilizing the techniques described herein.

While the example of FIG. 1 is represented in terms of "transmission periods" and percentages, it should be understood that the techniques described herein should not be limited by specific nomenclature. The example 112 illustrated in FIG. 1 may be understood as two successive TDD frames, wherein the Bluetooth connection receives 80% of the time, data, or other measurement (e.g., "X", which is what is allotted to Bluetooth in terms of radio resources) associated with each of the TDD frames, and the Wi-Fi connection receives the remainder (e.g., "100–X"). In various embodiments, the 80% (i.e., "X") allotted to Bluetooth may correspond to some number of Bluetooth time slots (e.g., 625 microseconds each). In other embodiments, the TDD frame may be represented in terms of time (e.g., 10 milliseconds per TDD frame), and allotting 80% to Bluetooth and 20% to Wi-Fi means that Bluetooth has 8 milliseconds per TDD frame to communicate and Wi-Fi has 2 milliseconds per TDD frame to communicate. In other embodiments, a mix of time slots and percentage may be utilized, and so forth.

As an example, the base device 102 of FIG. 1 may have a setting or other instruction (e.g., Bluetooth profile) directing 80% of each transmission period is to be allocated to the Bluetooth connection 110 with a Bluetooth device 106, and any remaining portion of the transmission period may be allocated to other transmissions, which in this example is the Wi-Fi connection 108 with the Wi-Fi device 104, although as discussed earlier, any number of devices and connection types may be managed using the techniques described herein. If the transmission periods in this example comprise 10 milliseconds each, then 8 milliseconds of each transmission period may be used for Bluetooth and 2 milliseconds may be used for Wi-Fi (or additional technologies, in various embodiments). If a different Bluetooth profile is used, such as the Bluetooth device being associated with a profile that instructs the base device 102 to allot 60% of each transmission period to Bluetooth, then 6 milliseconds of a 10-millisecond transmission period may be used for Bluetooth and 4 milliseconds for Wi-Fi. Different Bluetooth profiles or similar techniques may provide for different distributions of transmission periods. In various embodiments, while the duration of the transmission periods are measured by time, they are also subdivided into time slots. According to an embodiment, if a Bluetooth communication is partially through its allotted portion of a transmission period, and it is determined that no more Bluetooth traffic is forthcoming, then the remainder of the Bluetooth portion of the transmission period may be allotted (or "given") to the Wi-Fi connection.

FIG. 2A illustrates 200 an example approach for adaptively adjusting allotments of various transmission periods between wireless communication approaches, in accordance with various embodiments. For example, if a device is streaming music to a Bluetooth device over a Bluetooth connection, while also communicating data to a Wi-Fi device over a Wi-Fi connection, and as described herein the two connections are not able to be simultaneously active and at least the Bluetooth connection has a predefined (e.g., default, etc.) allotment (e.g., percentage, time slots, etc.) of a transmission period reserved solely for its data communication, then the device may monitor the Bluetooth connection for actual usage and, in some embodiments, channel characteristics associated with the Bluetooth connection, which may indicate a quality of the Bluetooth connection. Based on the actual usage (e.g., the actual time a Bluetooth (or other) radio spends transmitting, an amount of data transmitted, the number of time slots consumed by transmission, etc.) of the Bluetooth connection during a particular transmission period, and in some embodiments based additionally (or only) on the channel characteristics, then the predefined allotment reserved for Bluetooth may be adaptively reduced, such as over one or more successive transmission periods, thereby providing a greater portion of the transmission period(s) to the Wi-Fi connection.

In a first transmission period 202, 80% of the transmission period is allotted to the Bluetooth connection and 20% to the Wi-Fi connection. Once the first transmission period 202 ends, then in an embodiment the actual usage percentage 204 of the Bluetooth connection is determined, which in this example is 30%. Because 30% is less than the allotted 80%, an adaptive adjustment to successive transmission periods may be made, although in alternate embodiments, an adaptive adjustment may be made in any one of the following frames. In some embodiments, as discussed more fully herein, some number of buffer frames may be utilized between active transmission periods.

In the example of FIG. 2A, the second transmission period 206 sees a reduction in the portion allotted to Bluetooth, down to 70%, although in various embodiments, a reduction may be more or less, depending on various factors, or may be an increase, as discussed more fully herein. The remaining 30% may now be utilized by the Wi-Fi connection. A change in an allotted portion may be of a consistent amount, such as 10% each successive transmission period, or may adaptively increase or otherwise change for each transmission period (e.g., 5% one transmission period, 10% the next, 20% the next, until a target is reached, etc.), depending on the embodiment and various factors.

Once the second transmission period 206 ends, then the actual usage percentage 208 of the Bluetooth connection is determined, which in this example remains at 30%. Because 30% is less than the allotted 70%, an adaptive adjustment to successive transmission periods may be made. In some embodiments, a lower limit or floor on the Bluetooth allotment may be implemented, such that no further adaptive adjustments may be made once the floor is reached, even if the actual Bluetooth usage is below an allotted amount (e.g., if the floor is set at 70%, then no further reductions would be made past that, although increases may be made if conditions warrant, such as the Bluetooth usage percentage rising or channel quality decreasing, etc.). In some embodiments, the floor may be based on a particular Bluetooth device and/or Bluetooth profile, historical data, performance statistics, intended use of the device, etc.

In the example of FIG. 2A, the third transmission period 210 sees a further reduction in the portion allotted to Bluetooth, down to 50%, with the remaining 50% available for use by the Wi-Fi connection. As an example, because the 30% actual usage 208 in the second transmission period 206 remains a certain amount below the allotted usage, then the reduction may be adaptively increased for the next transmission period (e.g., 20% instead of the previous 10%), although in various embodiments, reductions (or increases) may be of a fixed amount for each successive transmission period, or may be variable and based on criteria in addition to, or exclusive of, actual usage of one of the wireless connections.

Once the third transmission period 210 ends, then the actual usage percentage 212 of the Bluetooth connection is determined again (although in various embodiments, an actual usage of a wireless connection and/or channel characteristics may not be determined for each transmission period), which in this example remains at 30%. Because 30% is less than the allotted 50%, an adaptive adjustment to successive transmission periods may be made.

In the example of FIG. 2A, the fourth transmission period 214 sees a further reduction in the portion allotted to Bluetooth, down to 35%, with the remaining 65% available for use by the Wi-Fi connection (or other connections in various embodiments). In some embodiments, the extra 5% of the allotment over the actual usage comprises a buffer, as described herein. In embodiments utilizing a buffer, it is envisioned that the allotment must be higher than the actual usage by some amount to accommodate a buffer (e.g., 35% allotment vs. 30% actual usage as in 214), while in other embodiments, the allotment may equal the actual usage (e.g., 30% allotment vs. 30% actual usage). In some embodiments, when the actual usage rate of the Bluetooth connection is equal to the allotment (minus the buffer, if applicable), in some embodiments no further adaptive adjustments may be made as long as the Bluetooth usage rate remains constant at the 30%. If the Bluetooth usage rate were to decrease further, then in some embodiments additional adaptive adjustments may be made. In some embodiments, the allotment to Bluetooth may not be lower than the actual Bluetooth usage rate plus some portion. For example, if an initial Bluetooth allotment is 80%, and the actual Bluetooth usage rate is determined to be 30%, then in a successive transmission period (e.g., TDD frame, etc.) the Bluetooth allotment may be adaptively adjusted to 30% plus some additional portion (e.g., the 5% of 214), which may be implemented as a minimum or maximum of two or more time slots, according to various embodiments (e.g., if the time slots are 625 µs each, then the allotment may be adjusted to (30% (of the time slots)+(2*625 µs)). A number of buffer time slots may be determined as a function of RSSI, number of re-transmissions, and an amount of actual Bluetooth usage rate in relation to an allotment, among other factors. By receiving two "extra" slots, a buffer is created to account for various factors such as channel changes that may occur between TDD frames. In various embodiments, the amount of any buffer may be set to any amount, or may be adaptively determined and set based on various factors, such as channel quality, user settings, firmware settings, etc.

FIG. 2B illustrates 220 an example approach for adaptively adjusting allotments of various transmission periods between wireless communication approaches, in accordance with various embodiments. As with the example illustrated in FIG. 2A, in this example a device is streaming music to a Bluetooth device over a Bluetooth connection, while also communicating data to a Wi-Fi device over a Wi-Fi connection.

In a first transmission period 222, 80% of the transmission period is allotted to the Bluetooth connection and 20% to the Wi-Fi connection. Once the first transmission period 222 ends, then in an embodiment the actual usage percentage 224 of the Bluetooth connection is determined, which in this example is 30%. Because 30% is less than the allotted 80%, an adaptive adjustment to successive transmission periods may be made, as discussed herein.

In the example of FIG. 2B, the second transmission period 226 sees a reduction in the portion allotted to Bluetooth, down to 35%, although in various embodiments, a reduction may be more or less, depending on various factors, or may be an increase, as discussed more fully herein. As discussed above with reference to FIG. 2A and additionally herein, in some embodiments the allotment to Bluetooth will always be greater than the actual usage in order to accommodate a buffer (e.g., 35% allotment vs. 30% actual usage in 226), while in other embodiments the allotment to Bluetooth may equal the actual usage in lieu of a buffer. The remaining 65% may now be utilized by the Wi-Fi connection. In comparison to the example illustrated in FIG. 2A, in this example the adaptive adjustment was to reduce the Bluetooth allotment to match the actual usage plus a buffer. In various embodiments, the allotment may not be exactly matching the actual usage of a previous transmission period; for example, as discussed above, some number of portions (e.g., time slots, percentage, etc.) may be reserved as a buffer. Additionally, there may be a limit or floor amount below which the allotted percentage for Bluetooth may not be set, which may or may not take into account a buffer.

Once the second transmission period 226 ends, then the actual usage percentage 228 of the Bluetooth connection is determined, which in this example remains at 30%. According to an embodiment, a determination may be made, based on the actual usage rate, channel conditions, and/or other factors that the Bluetooth connection may need more than the newly adjusted 35% allotment (the extra 5% comprising a buffer in some embodiments as discussed herein). In the example of FIG. 2B, the third transmission period 230 sees an increase in the portion allotted to Bluetooth, up to 40%, although in various embodiments, an increase may be more or less, depending on various factors. The remaining 60% may now be utilized by the Wi-Fi connection. A determination of the amount of the increase may be based on channel conditions, user preferences, predictive monitoring, or any other factor(s) such as received signal strength indicator (RSSI), modulation scheme, data rate, and/or packet re-transmission statistics.

Once the third transmission period 230 ends, then the actual usage percentage 232 of the Bluetooth connection is determined, which in this example has increased to 40%, for example because of channel changing or an increase in channel traffic. In some embodiments, any increase in the Bluetooth usage rate may trigger an alarm and a corresponding increase in the transmission period allotment, either in an immediately succeeding period or over several succeeding periods. In an embodiment, an increase over more than one succeeding periods may be increased, stopped, or even reversed if the actual usage rate of the wireless connection changes (e.g., increases, drops, etc.) and/or if other factors such as channel conditions so indicate.

In the example of FIG. 2B, the fourth transmission period 234 sees an increase in the portion allotted to Bluetooth, up to 80%, with the remaining 20% available for Wi-Fi communication. In an embodiment, a maximum (e.g., cap) value may be indicated, which the Bluetooth allotment may not exceed. This maximum value in some embodiments may not exceed, or may be greater or less than the original predefined (default) percentage, and may be based on various factors such as channel quality, communication performance, historical usage rates, packet analysis, received signal strength indicator (RSSI), modulation scheme, data rate, packet re-transmission statistics, etc. In some embodiments, the cap may be based on a particular Bluetooth device and/or Bluetooth profile, historical data, performance statistics, intended use of the device, etc.

In addition to, or in place of, determinations regarding actual or predicted usage rates of various wireless communication approaches, channel characteristics and/or criteria associated with the various wireless connections and/or devices, such as those listed above and additionally herein, may be utilized in numerous ways as part of a determination regarding how to adaptively adjust transmission period allotments. For example, if a Bluetooth channel is determined to be "good," then Bluetooth can pack more data into packets that it sends, and therefore send less packets over a time period, which uses less time to transmit. By determining that more data is being transmitted, a determination about adaptive adjustments to wireless communication allotments may be made. Additionally, a received signal strength indicator (RSSI) may be analyzed, a measurement of number of re-transmissions necessary to send data may be taken, a determination of which modulation scheme Bluetooth is currently using may be made, etc. For example, if a Bluetooth device is using a particular modulation scheme, it may be determined that the Bluetooth device is in proximity to the host device with a good connection, resulting in packets containing greater amounts of data with fewer re-transmissions, which could lead to a reduction (or acceleration in an ongoing reduction) in the Bluetooth allotment.

If the communication channels are determined to be poor, or getting worse (e.g., the Bluetooth device is old, does not support better modulation schemes, is positioned far away from the host device, is subject to additional interference on the 2.4 GHz band, etc.), then for example the modulation scheme may be lower, requiring more packets to transmit data, and requiring an increase in (or a halt in a reduction to) a Bluetooth transmission period allotment.

In various embodiments, an adaptive adjustment to an allotment of a transmission period may take place in stepwise fashion. For example, as discussed above with reference to FIGS. 2A and 2B, a percentage allotment for the Bluetooth connection may be determined to be too high (i.e., the actual usage rate and/or other determinations such as quality, etc., do not warrant the current allotment percentage), and an adaptive adjustment is forthcoming. Instead of reducing the allotment directly to the usage rate (e.g., plus a buffer), the allotment may be reduced by 5% one transmission period, then 10% another transmission period, then 5% another transmission period, and so forth. A percentage decrease may be made over periods of time, for example 10% every 100 milliseconds. Increases may proceed in a similar fashion. For example, some embodiments may reduce the allotment by some n percent every t amount of time. In other embodiments, a gradient of change applied to the allotment (e.g., the succeeding values of "X" as discussed above) may be a function of various parameters such as, but not limited to: channel quality, communication performance, historical usage/error/re-transmission rates, packet analysis, received signal strength indicator (RSSI), modulation scheme, data rate, packet re-transmission statistics, etc. Examples may reduce x at a time n to x at a time n+1 where the increment of time may be defined as 100 milliseconds or some other period such as time slots, for example.

A particular amount of an adaptive adjustment for each transmission period may be based on determinations associated with the wireless connection at issue. For example, characteristics of the connection (RSSI, modulation scheme, etc. as discussed herein) may be utilized to determine an optimal amount to reduce the particular allotment each transmission period, or in other embodiments, a fixed amount may be utilized without regard to other factors. The characteristics of the connection (and the values and/or parameters measured and compared, for example with historical data) used may be related to the buffer allocation, as described herein; for example, if the device notices a reduction in RSSI and no change in the modulation scheme, that could indicate that it needs a larger buffer size. If it observes higher re-transmission rate, that also could indicate that it needs a larger buffer size.

FIG. 3 illustrates an example process 300 for adaptive wireless frequency band sharing, in accordance with various embodiments. It should be understood that, for any process discussed herein, there can be additional, fewer, or alternative steps performed in similar or alternative orders, or in parallel, within the scope of the various embodiments unless otherwise stated. In accordance with various embodiments, a device, such as a host device, can be configured to establish 302 wireless connections with other devices. As discussed further herein, these wireless connections may be of the same or different types, and may encompass any number of wireless technologies, such as Wi-Fi, Bluetooth, Bluetooth Low Energy, the 802.15.4 family of standards such as ZigBee, and the like.

For example, a host device may have radios for Bluetooth and Wi-Fi wireless transmission, or may have a combined radio that broadcasts both Bluetooth and Wi-Fi by virtue of physical switches that turn on and off depending on which technology is desired to be broadcast at a particular point in time. The wireless connections are made between the host device and the other devices, such as a Bluetooth device and a Wi-Fi device, and according to an embodiment, the wireless connections (e.g., Bluetooth and Wi-Fi) communicate data wirelessly over a shared frequency band (e.g., 900 MHz, 2.4 GHz, or 5.8 GHz), which as described earlier, can result in interference, scrambled transmission, and/or degraded performance without the use of techniques described herein.

Data communication is performed 304 during a first transmission period, which in some embodiments may comprise a discrete period of time ("time period") during which data communication takes place (e.g., 10 milliseconds, 100 hertz, etc.), a number of bytes, a frame (e.g., a frame as utilized in a TDD or similar approach), or other measurement, and which can be divided into various portions, such as percentages, time slots, discrete time portions, data size, etc. In this first transmission period, which may be the initial period that the wireless connections are communicating data or any subsequent period, the period is divided between the wireless connections (e.g., Bluetooth and Wi-Fi), such that only one wireless connection is communicating data at any one time, such as during a portion of the period that is assigned to the wireless connection (e.g., by a host device according to a Bluetooth profile, etc.). This assignment may take the form of specific times during the transmission period at which each of the wireless connections may communicate data, or may be a certain percentage of the transmission period that is utilized by each of the wireless connections, such as a wireless connection using the first 70% of a transmission period and another wireless connection using the remaining 30% of the transmission period. In some embodiments, the wireless connections use their assigned portion in its entirety before handing off to the other wireless connection, while in other embodiments the wireless connections take turns broadcasting data until they complete their assigned portion (e.g., of time, of data, etc.). As discussed herein, techniques of the present disclosure may address situations wherein a wireless connection (e.g., Bluetooth) does not utilize its entire assigned portion, and future assigned portions are reduced through various approaches. While approaches exist to simultaneously communicate data over various wireless connections that share the identical frequency band, some embodiments described herein are utilized in a situation where such simultaneous transmission is either impossible or turned off.

An actual amount of the first transmission period utilized 306 by one or more of the wireless connections (e.g., Bluetooth) to communicate data is then determined. For example, a Bluetooth connection may be assigned 70% of the first transmission period, and it is determined that it only used 30% of the assigned portion (e.g., time, bytes, frames, slots, etc.). As a result, data communication is prepared for a second transmission period, wherein a new portion is assigned to at least one of the wireless connections (e.g., Bluetooth) to communicate data. For example, where a Bluetooth connection was assigned 70% of the first transmission period, it may only be assigned 30% of the second transmission period. In various embodiments, a new portion assigned to a wireless connection in a succeeding transmission period is at least equal to the actual amount the connection was determined to have used in the preceding transmission period. It should be understood that in various embodiments, any number of previous transmission periods may be utilized in a determination of a new portion assigned to a wireless connection in a succeeding transmission period. For example, data related to actual time used by a Bluetooth connection, actual data rate used by the Bluetooth connection, and any other type of parameter or measurement associated with the Bluetooth connection may be collected, stored, measured, and analyzed for any number of preceding transmission periods in order to predict and allocate the new portion. Based on the historical analysis, the new portion (e.g., allocation) may be determined, along with any buffer, as appropriate.

FIG. 4 illustrates another example process 400 for adaptive wireless frequency band sharing, in accordance with various embodiments. In this example, a Bluetooth connection is established 402 with a Bluetooth-enabled device (e.g., a "Bluetooth device" such as a cellphone, audio device, game controller, etc.) and a Wi-Fi connection is established with a Wi-Fi enabled device (e.g., a router, modem, access point, computer, smart phone, etc.). In an embodiment, the Bluetooth connection and the Wi-Fi connection utilize the same frequency band (e.g., 2.4 GHz, etc.) and utilize a TDD scheme for data communication, although other schemes are envisioned in alternate embodiments.

During a first time period, data communication with the Bluetooth device and with the Wi-Fi device is performed 404; for example, with a base station or host device (e.g., computer, laptop, game console, etc.), which in some embodiments has one or more wireless radio devices to broadcast various wireless connections of varying technologies such as Bluetooth and Wi-Fi. In this time period, as discussed herein, a first portion (e.g., percentage) is allotted to the Bluetooth connection and the Wi-Fi connection utilizes the remaining portion (e.g., remaining percentage) left over. For example, the Bluetooth connection may be assigned 70% of the first time period (e.g., 700 milliseconds of a 1000 millisecond time period) and the Wi-Fi connection may use up to 30% of the time period (e.g., 300 milliseconds of a 1000 millisecond time period). In an embodiment, the Bluetooth connection (or other connection in other embodiments) has a predefined percentage of the first time period; for example, this may comprise a default value that is assigned to Bluetooth in all time periods, or just the initial time period when data communication is started. This predefined percentage may be supplied by a Bluetooth profile, a user preference, a firmware setting, or similar approach.

An actual percentage of the first time period used by the Bluetooth connection for data communication is determined 406. For example, if the Bluetooth connection is assigned 70% of the first time period, it may only use 30%; similarly, if the Bluetooth connection is assigned 10 time slots (which may be determined to equal some percentage of the time period), it may only use three.

Characteristics associated with the Bluetooth connection may be monitored 408 during the first time period. For example, these characteristics may include channel strength, communication performance, historical usage rates, packet analysis, received signal strength indicator (RSSI) values, modulation schemes used, data rates, packet re-transmission statistics, and the like. By evaluating these characteristics, and in some embodiments comparing values associated with one or more characteristics, such as to a predetermined amount and/or between transmission periods, a "quality" of the Bluetooth connection (e.g., channel) may be determined 410. For example, if the RSSI value remains above a threshold value during the first time period, this may indicate a "good" connection (e.g., the quality has not decreased over the period), over which the Bluetooth connection can pack more data into each packet and lose less transmission time due to re-transmission of dropped packets, for example. As another example, use of a particular modulation scheme may indicate that the Bluetooth connection is strong. Another example that a device can measure and correlate with the channel quality is the number of re-transmissions. Any number of characteristics associated with the Bluetooth connection (or any other wireless connection in other embodiments) as known in the art may be evaluated or compared to various thresholds or predetermined values, as is known in the art, to determine a "quality" of a connection (e.g., did the quality increase or decrease during an observed period).

Based on either the actual usage of the assigned portion of the transmission period by the Bluetooth connection for data communication, and/or the monitoring of channel characteristics as described above, a new percentage (e.g., a "revised percentage") is determined 412 for the Bluetooth connection for a succeeding time period. In some embodiments, this may be an immediately succeeding transmission/time period (or frame), while in other embodiments some number of time periods (or frames, etc.) may be skipped before the new percentage is utilized. In some embodiments, this revised percentage may be an increase from the predefined percentage or may be a decrease, depending on the actual usage and/or the monitored quality, as described above. In some embodiments, any number of past transmission periods (e.g., a history associated with the usage of one or more of the wireless connections) may be analyzed as part of determining the new percentage allocated to Bluetooth (or other technology) for a particular frame (e.g., the current frame or some future frame). According to various embodiments, it may be determined that the current frame for which allocation is desired is greater than some variable, such as one (e.g., one being the first frame) or some number of historical frames. If the frame number were less than the variable, then the allocation would be the default/predefined percentage as discussed above (e.g., 80%/20%), or would be determined based on whatever historical data (including but not limited to the actual number of time slots used for Bluetooth and the Bluetooth data rate) is available; however, if the frame is a frame number greater than the variable, then a procedure for determining an allocation could be performed. For example, the actual Bluetooth data rate of the historical number of frames and the actual number of time slots (or usage percentage in various embodiments) used by Bluetooth in the historical number of frames may be measured and analyzed. These data points may be counted from the moment that a TDD switch flipped from Wi-Fi to Bluetooth, and vice versa, for example. Based on the history analysis, a prediction of time that will be used by Bluetooth in the current frame may be determined. Once an estimate of the actual time that the Bluetooth will use is determined, then the amount of time (or percentage) allocated to Bluetooth in the current frame may be determined, for example based on the actual time from the historical analysis plus some buffer. The buffer may comprise some number of time slots, which may be based on an analysis of various factors, such as RSSI, re-transmissions, or some alarm/alert condition. An alarm/alert condition may be triggered by a determination that the Bluetooth connection for a frame used all of the allocation (such as with element 232 in FIG. 2B). An alarm/alert condition may also be triggered based on the actual Bluetooth usage in relation to the type of Bluetooth peripheral or device, the intended use of the Bluetooth device, etc., as discussed herein.

In an embodiment, the revised percentage may be further revised, such as in succeeding transmission periods after analysis of actual usage rates and/or quality. In an embodiment, a predetermined maximum amount (or "cap") exists above which the Bluetooth connection may not be assigned. This cap may be greater or less than the predefined percentage. For example, the predefined percentage for Bluetooth may be 70%, and this may be lowered to 30% in subsequent transmission periods. Due to usage rates, quality determinations, interference, etc., it may be required that the portion allotted to Bluetooth be increased. If the cap is set at 80%, then the portion allotted to Bluetooth may rise to that amount. If the cap is 60%, then the portion allotted to Bluetooth may rise to that amount only, despite the predefined (initial, default, etc.) percentage being 70%. In various embodiments, an increase in a portion allotted to a Bluetooth connection may be based at least in part on a Bluetooth profile associated with the Bluetooth-enabled device and/or the Bluetooth connection, the Bluetooth-enabled device type, an intended use of the Bluetooth-enabled device, or characteristics associated with the Bluetooth connection. For example, an intended use of a Bluetooth connection may be to stream audio, which can take a large amount of bandwidth of a Bluetooth connection. Based on this intended use, the predetermined maximum value may be 90% (i.e., higher than the predefined percentage). In other embodiments, a Bluetooth-enabled device type may be determined to be a remote control, which may not require a large portion of bandwidth. In this example, the cap may be set to 50% (i.e., lower than the predefined percentage), in which case the predefined percentage would control until the allotted portion decreased below the cap, such as because of the Bluetooth-enabled device not using its allotted portion and it therefore being adaptively adjusted downwards.

In the example of FIG. 4, a number of buffer time slots 414 may then be determined. In some embodiments, the buffer time slots may comprise a percentage of a transmission/time period (e.g., 2% added to a 30% assigned portion for Bluetooth), while in other embodiments, the buffer time slots may comprise TDD time slots or other portions based on criteria such as time, bytes, percentage, etc. As discussed herein, this buffer (e.g., guard frames, etc.) may be utilized to provide flexibility for situations where channels change or other actions are undertaken to maintain the wireless connections. The new percentage for the Bluetooth connection (e.g., based on actual usage, quality, Bluetooth profiles, etc.) plus the buffer amount is then assigned 416 to the Bluetooth connection for the second (or a subsequent) time period.

According to an embodiment, information related to a Bluetooth allocation may be communicated or otherwise provided to a component associated with control of the Wi-Fi transmission (e.g., a microcontroller communicatively coupled to the Wi-Fi radio, etc.), so that the Wi-Fi radio may utilize the information to optimize its transmission. For example, the Wi-Fi component may adjust its performance/parameters/etc. based on the amount of time (e.g., percentage, time slots, etc.) that it has allocated to it (e.g., 20% when Bluetooth is allocated 80%). Given this information, the Wi-Fi connection may be optimized based on knowing how much time Wi-Fi has before a Bluetooth interrupt. A key advantage of the techniques described herein is to provide more time for a Wi-Fi connection to broadcast, and this is enhanced by allowing the Wi-Fi component to optimize its transmission based on the allocation information.

Figure 5:
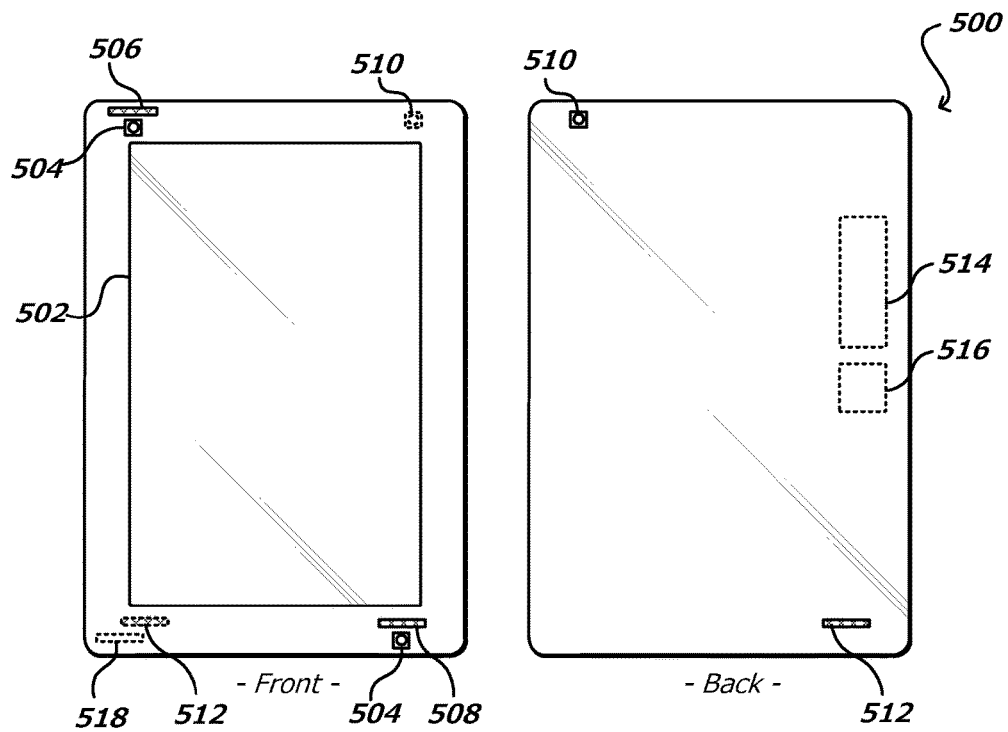
FIG. 5 illustrates front and back views of an example portable computing device that can be used in accordance with various embodiments.

FIG. 5 illustrates front and back views of an example electronic computing device 500 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 500 has a display screen 502 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 504 on the front of the device and at least one image capture element 510 on the back of the device. It should be understood, however, that image capture elements could also, or alternatively, be placed on the sides or corners of the device, and that there can be any appropriate number of capture elements of similar or different types. Each image capture element 504 and 510 may be, for example, a camera, a charge-coupled device (CCD), a motion detection sensor or an infrared sensor, or other image capturing technology.

As discussed, the device can use the images (e.g., still or video) captured from the imaging elements 504 and 510 to generate a three-dimensional simulation of the surrounding environment (e.g., a virtual reality of the surrounding environment for display on the display element of the device). Further, the device can utilize outputs from at least one of the image capture elements 504 and 510 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 508 on the front side, one microphone 512 on the back, and one microphone 506 on or near a top or side of the device. In some devices there may be only one microphone, while in other devices there might be at least one microphone on each side and/or corner of the device, or in other appropriate locations.

The device 500 in this example also includes one or more orientation- or position-determining elements 518 operable to provide information such as a position, direction, motion, or orientation of the device. These elements can include, for example, accelerometers, inertial sensors, electronic gyroscopes, and electronic compasses.

The example device also includes at least one communication mechanism 514, such as may include at least one wired or wireless component operable to communicate with one or more electronic devices. The device also includes a power system 516, such as may include a battery operable to be recharged through conventional plug-in approaches, or through other approaches such as capacitive charging through proximity with a power mat or other such device. Various other elements and/or combinations are possible as well within the scope of various embodiments.

Figure 6:
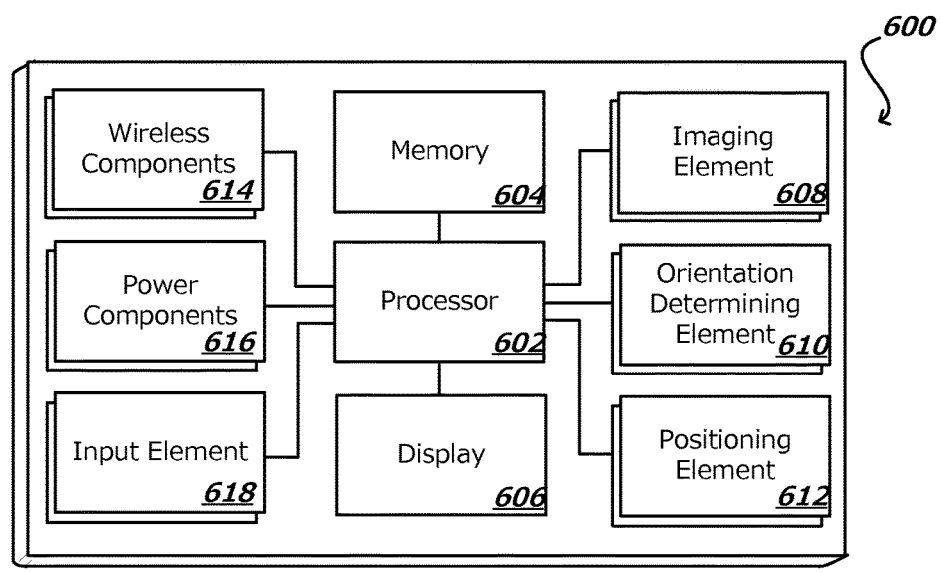
FIG. 6 illustrates an example set of basic components of a portable computing device, such as the device described with respect to FIG. 5.

FIG. 6 illustrates a set of basic components of an electronic computing device 600 such as the device 500 described with respect to FIG. 5. In this example, the device includes at least one processing unit 602 for executing instructions that can be stored in a memory device or element 604. As would be apparent to one of ordinary skill in the art, the device can include many types of memory, data storage, or computer-readable media, such as a first data storage for program instructions for execution by the processing unit(s) 602, the same or separate storage can be used for images or data, a removable memory can be available for sharing information with other devices, and any number of communication approaches can be available for sharing with other devices.

The device typically will include some type of display element 606, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 608, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 600 also includes at least one orientation determining element 610 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 600. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 612 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 614 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 616, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 618 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 7:
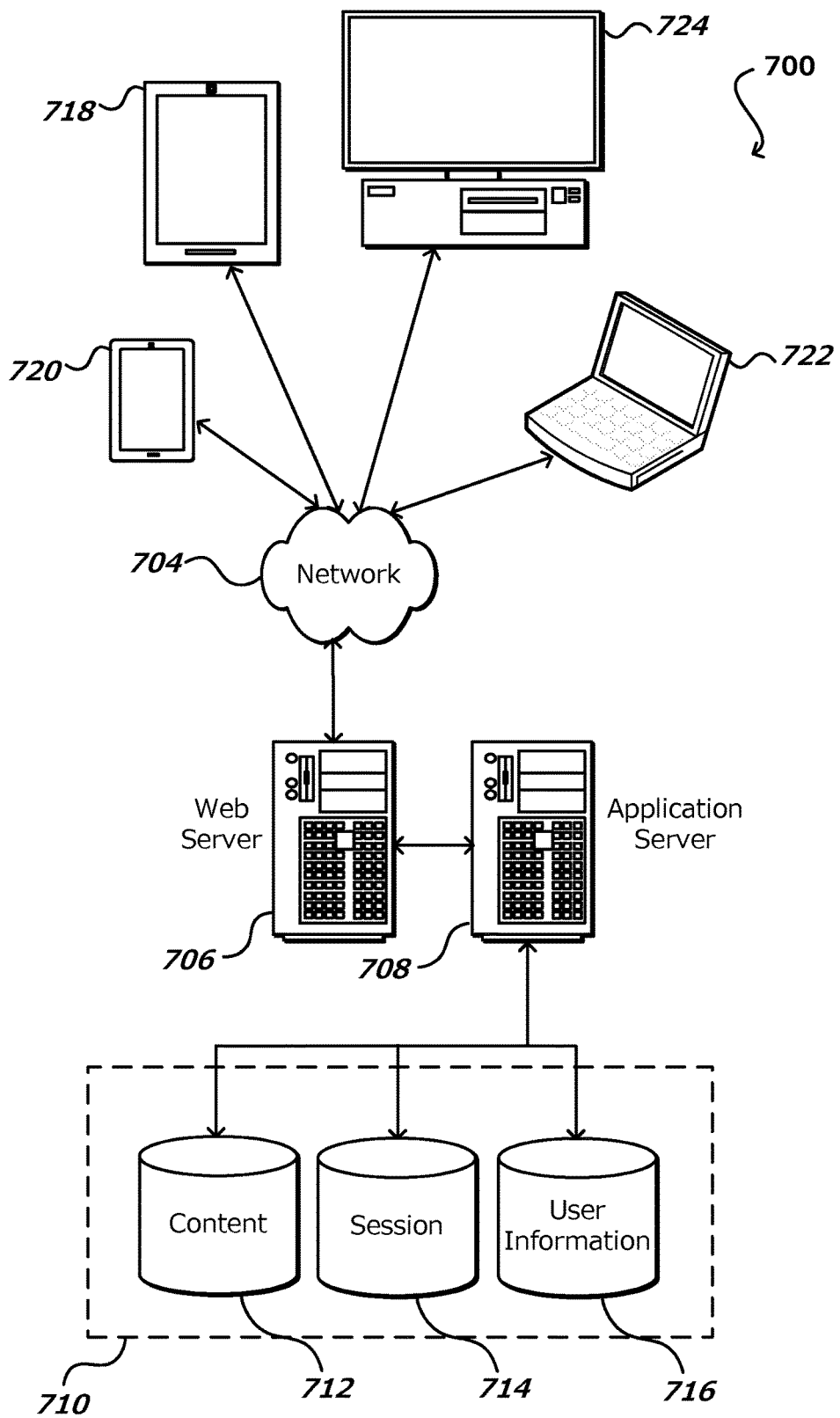
FIG. 7 illustrates an example of an environment for implementing aspects in accordance with various embodiments.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes electronic client devices 718, 720, 722, and 724, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks, an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 708 can include any appropriate hardware and software for integrating with the data store 710 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 706 in the form of HTML, XML or another appropriate structured language in this example. The handling of all requests and responses, as well as the delivery of content between the client devices 718, 720, 722, and 724 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing content (e.g., production data) 712 and user information 716, which can be used to serve content for the production side. The data store is also shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 718, 720, 722 and 724. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Various systems, devices, methods, and approaches described herein may be implemented on one or more general-purpose and/or specific computing devices, such as under the control of one or more computer systems configured with executable instructions, the computer systems for example having one or more processors which may be communicatively coupled to other components such as one or more memory units that may store the instructions for execution. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method, comprising:
   establishing, by a source device, a first wireless connection with a first device and a second wireless connection with a second device, wherein the first wireless connection and the second wireless connection communicate data over a shared frequency band;
   communicating, by the source device, with the first and second devices during a first transmission period, wherein the first wireless connection is allotted a first portion of the first transmission period and the second wireless connection is allotted a remaining portion of the first transmission period;
   determining, by the source device, an actual amount of the first transmission period used for data communication by the first wireless connection;
   communicating, by the source device, with the first and second devices during a second transmission period, wherein the first wireless connection is allotted a second portion of the second transmission period and the second wireless connection is allotted a remaining portion of the second transmission period, the second portion being different from the first portion and at least equal to the actual amount;
   comparing, by the source device, a first value associated with characteristics of the first wireless connection during the first transmission period with a second value associated with characteristics of the first wireless connection during the second transmission period;
   determining, by the source device, that a quality of the first wireless connection during the second transmission period has not decreased from a predetermined threshold, wherein the determination is made based on the comparison of the first value and the second value; and
   calculating, by the source device, the second portion, based in part on the determination that the quality of the first wireless connection meets the predetermined threshold.

2. The computer implemented method of claim 1, further comprising:
   monitoring, by the source device, characteristics of the first wireless connection;
   determining, by the source device, based on the characteristics, that the quality of the first wireless connection meets the predetermined threshold;
   determining, by the source device, based on the comparison of the actual amount and the first portion, that the first wireless connection is not communicating data during the entire first portion; and
   calculating, by the source device, the second portion, based in part on the determination that the quality of the first wireless connection meets the predetermined threshold or the determination that the first wireless connection is not communicating data during the entire first portion.

3. The computer implemented method of claim 2, wherein the characteristics of the first wireless connection include at least one of channel quality, current performance statistics, historical usage, packet analysis, received signal strength indicator (RSSI) values, modulation schemes, data rates, or packet re-transmission statistics.

4. The computer implemented method of claim 1, further comprising:
   monitoring, by the source device, characteristics of the first wireless connection;
   determining, by the source device, based at least on the characteristics, that a quality of the first wireless connection is below the predetermined threshold;
   determining, by the source device, based at least on a comparison of the actual amount and the first portion, that the first wireless connection is communicating data during at least a threshold amount during the first portion; and
   calculating, by the source device, the second portion, based at least in part on the determination that the quality of the first wireless connection is below the predetermined threshold or the determination that the first wireless connection is communicating data during at least a threshold amount during the first portion.

5. The computer implemented method of claim 4, wherein the second portion does not exceed a predetermined maximum threshold value, the predetermined maximum threshold value being less than the first portion.

6. The computer implemented method of claim 1, wherein the first wireless connection is a Bluetooth connection and the first device is a Bluetooth-enabled device, and further comprising:
   determining, by the source device, an actual amount of the second transmission period used for Bluetooth communication with the Bluetooth-enabled device over the Bluetooth connection;
   determining, by the source device, a third portion of a third transmission period to be assigned to the Bluetooth-enabled device, based at least in part on a Bluetooth profile associated with the Bluetooth-enabled device, the Bluetooth-enabled device type, an intended use of the Bluetooth-enabled device, or characteristics associated with the Bluetooth connection, wherein the third portion does not exceed a predetermined maximum value.

7. The computer implemented method of claim 1, further comprising:
   determining, by the source device, an actual amount of the second transmission period used for data communication by the first device over the first wireless connection;
   communicating, by the source device, with the first and second devices during a third transmission period, wherein the first wireless connection is allotted a third portion of the second transmission period, and wherein the third portion is determined based at least in part on a comparison of the actual amount of the first transmission period with the actual amount of the second transmission period or a comparison of the first portion of the first transmission period with the second portion of the second transmission period.

8. The computer implemented method of claim 1, wherein the first wireless connection is a Bluetooth connection and the first device is a Bluetooth-enabled device, and wherein the first and second transmission periods comprise Time Division Duplex (TDD) frames, further comprising:
   determining, by the source device, a number of Bluetooth time slots corresponding to the first transmission period and the first portion; and
   increasing, by the source device, the second portion by a predetermined number of Bluetooth time slots.

9. The computer implemented method of claim 1, wherein the second wireless connection comprises a Wi-Fi connection, and further comprising:
communicating, by the source device to a component associated with the Wi-Fi connection, information describing an amount of the remaining portion of the second transmission period allotted to the Wi-Fi connection; and
changing, by the component associated with the Wi-Fi connection, at least one parameter associated with the Wi-Fi connection based at least on the information describing an amount of the remaining portion of the second transmission period allotted to the Wi-Fi connection6.

10. The computer-implemented method of claim 1, wherein the shared frequency band is one of 900 MHz, 2.4 GHz, or 5.8 GHz.

11. A computing device, comprising:
at least one processor;
memory including instructions that, when executed by the processor, cause the computing device to:
establish, by a source device, a first wireless connection and a second wireless connection with one or more wireless devices, wherein the first wireless connection and the second wireless connection communicate data with the wireless devices over a shared frequency band;
communicate, by the source device, with the one or more wireless devices during a first period, wherein the first wireless connection is allotted a first subset of the first period and the second wireless connection is allotted a second subset of the first period;
determine, by the source device, an actual amount of the first period used for data communication with the one or more wireless devices by the first wireless connection;
communicate, by the source device, with the one or more wireless devices during a second period, wherein the first wireless connection is allotted a third subset of the second period and the second wireless connection is allotted a fourth subset of the second period, the third subset being at least equal to the actual amount of the first period used by the first wireless connection;
compare, by the source device, a first value associated with characteristics of the first wireless connection during the first period with a second value associated with characteristics of the first wireless connection during the second period;
determine, by the source device, that a quality of the first wireless connection during the second period has not decreased from a predetermined threshold, wherein the determination is made based on the comparison of the first value and the second value; and
calculate, by the source device, the second portion, based in part on the determination that the quality of the first wireless connection meets the predetermined threshold.

12. The computing device of claim 11, wherein the instructions, when executed, further cause the computing system to:
monitor, by the source device, characteristics of the first wireless connection;
determine, by the source device, based on the characteristics, that the quality of the first wireless connection meets the predetermined threshold;
determine, by the source device, based on the comparison of the actual amount and the first subset, that the first wireless connection is not communicating data during the entire first subset; and
calculate, by the source device, the third subset, based in part on the determination that the quality of the first wireless connection meets the predetermined threshold or the determination that the first wireless connection is not communicating data during the entire first subset.

13. The computing device of claim 11, wherein the instructions, when executed, further cause the computing system to:
monitor, by the source device, characteristics of the first wireless connection;
determine, by the source device, based at least on the characteristics, that a quality of the first wireless connection is below the predetermined threshold;
determine, by the source device, based at least on a comparison of the actual amount and the first subset, that the first wireless connection is communicating data during at least a threshold amount during the first subset; and
calculate, by the source device, the third subset, based at least in part on the determination that the quality of the first wireless connection is below the predetermined threshold or the determination that the first wireless connection is communicating data during at least a threshold amount during the first subset.

14. The computing device of claim 11, wherein the first wireless connection is a Bluetooth connection and the first wireless device is a Bluetooth-enabled device, and wherein the instructions, when executed, further cause the computing system to:
determine, by the source device, an actual amount of the second period used for Bluetooth communication with the Bluetooth-enabled device over the Bluetooth connection;
determine, by the source device, a fifth subset of a third transmission period to be assigned to the Bluetooth-enabled device, based at least in part on a Bluetooth profile associated with the Bluetooth-enabled device, the Bluetooth-enabled device type, an intended use of the Bluetooth-enabled device, or characteristics associated with the Bluetooth connection, wherein the fifth subset does not exceed a predetermined maximum value.

15. The computing device of claim 11, wherein the instructions, when executed, further cause the computing system to:
determine, by the source device, an actual amount of the second period used for data communication by the first wireless device over the first wireless connection;
communicate, by the source device, with the first and second wireless devices during a third transmission period, wherein the first wireless connection is assigned a fifth subset of the second period, and wherein the fifth portion is determined based at least in part on a comparison of the actual amount of the first period used by the first wireless connection with the actual amount of the second period used by the first wireless connection, or a comparison of the first subset of the first period with the third subset of the second period.

16. The computing device of claim 11, wherein the first wireless connection is a Bluetooth connection and the first wireless device is a Bluetooth-enabled device, and wherein the first and second periods comprise Time Division Duplex (TDD) frames, and wherein the instructions, when executed, further cause the computing system to:
    determine, by the source device, a number of Bluetooth time slots corresponding to the first period and the first subset; and
    increase, by the source device, the third subset by a predetermined number of Bluetooth time slots.

17. A computer implemented method, comprising:
    establishing, by a device, a Bluetooth connection with a Bluetooth-enabled device and a Wi-Fi connection with a Wi-Fi enabled device, wherein the Bluetooth connection and the Wi-Fi connection utilize the same frequency band;
    communicating, by the device, during a first time period, with the Bluetooth-enabled device over the Bluetooth connection and with the Wi-Fi enabled device over the Wi-Fi connection, wherein the Bluetooth connection is allotted a first percentage of the first time period for data communication;
    determining, by the device, during the first time period, channel characteristics associated with the Bluetooth connection;
    determining, by the device, a base channel quality of the Bluetooth connection, wherein the channel quality is represented by a value associated with at least one of the channel characteristics;
    reducing, by the device, for a second time period, the first percentage to generate a second percentage based at least in part on determining that an actual percentage of the first time period used by the Bluetooth connection is less than the first percentage, the second percentage being at least equal to the actual percentage;
    determining, by the device, during the second time period, channel characteristics associated with the Bluetooth connection;
    determining, by the device, that the channel quality of the Bluetooth connection during the second time period has not decreased from the base channel quality, wherein the determination is made based on comparing the value associated with at least one of the channel characteristics as determined during the first time period with a value associated with the at least one of the channel characteristics as determined during the second time period; and
    communicating, by the device, during the second time period, with Bluetooth-enabled device over the Bluetooth connection and the Wi-Fi enabled device over the Wi-Fi connection, wherein the Bluetooth connection is allotted the second percentage of the second time period for data communication and the Wi-Fi connection has a remaining percentage of the second time period for data communication.

18. The computer implemented method of claim 17, further comprising:
    reducing, for a third time period, the second percentage to generate a third percentage based at least in part on determining that the channel quality of the Bluetooth connection during the second time period has not decreased from the base channel quality; and
    communicating, during the third time period, with the Bluetooth-enabled device over the Bluetooth connection and the Wi-Fi enabled device over the Wi-Fi connection, wherein the Bluetooth connection is allotted the third percentage of the third time period for data communication and the Wi-Fi connection has a remaining percentage of the third time period for data communication.

19. The computer implemented method of claim 18, further comprising:
    determining an actual percentage of the second time period used by the Bluetooth connection for data communication with the Bluetooth-enabled device;
    determining that the third percentage is less than a sum of the actual percentage of the second time period and a buffer percentage; and
    adjusting the third percentage such that it is at least equal to the sum of the actual percentage of the second time period and the buffer percentage.

20. The computer implemented method of claim 17, further comprising:
    determining, by the device, during the second time period, the channel characteristics associated with the Bluetooth connection that were monitored during the first time period;
    comparing, by the device, the value associated with at least one of the channel characteristics as determined during the first time period with a value associated with the at least one of the channel characteristics as determined during the second time period;
    determining, by the device, that the channel quality of the Bluetooth connection during the second time period has decreased from the base channel quality, wherein the determination is made based on the comparison of the values associated with the at least one of the channel characteristics;
    causing, for a third time period, the second percentage to be increased by a second amount to generate a third percentage, wherein the third percentage does not exceed a maximum percentage, the maximum percentage based at least on a Bluetooth profile associated with the Bluetooth connection; and
    communicating, during the third time period, with the Bluetooth-enabled device over the Bluetooth connection and the Wi-Fi enabled device over the Wi-Fi connection, wherein the Bluetooth connection is allotted the third percentage for data communication and the Wi-Fi connection has a remaining percentage of the third time period for data communication.

\* \* \* \* \*